(12) United States Patent
Gui et al.

(10) Patent No.: US 11,474,376 B2
(45) Date of Patent: Oct. 18, 2022

(54) HINGE DESIGNS IN WEARABLE ELECTRONIC DEVICES

(71) Applicant: Vigo Technologies Inc., San Francisco, CA (US)

(72) Inventors: Jason Gui, San Francisco, CA (US); Aaron R. Rowley, Carlsbad, CA (US); Tiantian Zhang, San Francisco, CA (US)

(73) Assignee: Vigo Technologies, Inc., San Francisco, CA (US)

( * ) Notice: Subject to any disclaimer, the term of this patent is extended or adjusted under 35 U.S.C. 154(b) by 0 days.

(21) Appl. No.: 16/207,179

(22) Filed: Dec. 2, 2018

(65) Prior Publication Data
US 2020/0174281 A1 Jun. 4, 2020

(51) Int. Cl.
*G02C 5/22* (2006.01)
*G02C 11/00* (2006.01)
*H01Q 1/27* (2006.01)
*H02J 7/00* (2006.01)

(52) U.S. Cl.
CPC ............... *G02C 5/22* (2013.01); *G02C 11/10* (2013.01); *H01Q 1/273* (2013.01); *H02J 7/0045* (2013.01)

(58) Field of Classification Search
CPC ...................................................... G02C 5/22
USPC ................................................. 351/41, 153
See application file for complete search history.

(56) References Cited

U.S. PATENT DOCUMENTS

| | | | | |
|---|---|---|---|---|
| 5,606,743 | A * | 2/1997 | Vogt ................... | H04B 1/086 16/228 |
| 8,016,415 | B2 * | 9/2011 | Figler ................. | G02C 7/101 351/158 |
| 9,258,028 | B2 * | 2/2016 | Katayama .......... | H01Q 1/273 |
| 9,366,882 | B2 * | 6/2016 | Lurilli ................ | G02C 11/04 |
| 9,442,305 | B2 * | 9/2016 | Blum .................. | H02J 7/00 |
| 9,482,883 | B1 * | 11/2016 | Meisenholder ..... | G02C 5/2272 |
| 9,952,452 | B1 * | 4/2018 | Hanover ............. | G02C 11/10 |
| 11,181,757 | B1 * | 11/2021 | Ashwood ........... | H05K 7/2039 |
| 2008/0013041 | A1 * | 1/2008 | Chou .................. | G02C 11/06 351/158 |
| 2013/0235328 | A1 * | 9/2013 | Cauvet ............... | G02C 11/10 351/116 |
| 2016/0048025 | A1 * | 2/2016 | Cazalet .............. | G02B 27/0149 351/116 |
| 2017/0255029 | A1 * | 9/2017 | Klosinski, Jr. ..... | G02C 11/10 |
| 2018/0252940 | A1 * | 9/2018 | Rabut ................. | G02C 5/22 |
| 2019/0129200 | A1 * | 5/2019 | Moskowitz ........ | H05K 7/20445 |
| 2019/0235274 | A1 * | 8/2019 | Jouard ................ | G02C 7/083 |

* cited by examiner

Primary Examiner — Darryl J Collins
(74) Attorney, Agent, or Firm — Chia-Hsin Suen

(57) ABSTRACT

The disclosed embodiments provide a wearable electronic device. The wearable electronic device includes a frame containing a front portion configured to rest over a nose of a user, a first arm configured to rest over an ear of the user. The wearable electronic device also includes a first hinge connecting the front portion and the first arm. The first hinge includes an interior portion that houses a wire connected to a first electronic component in the front portion and a second electronic component in the first arm. The first hinge also includes an exterior portion that hides the wire during rotation of the first arm about the first hinge between a folded position and an unfolded position.

2 Claims, 10 Drawing Sheets

HINGE DESIGNS IN WEARABLE ELECTRONIC DEVICES

RELATED APPLICATIONS

The subject matter of this application is related to the subject matter in a co-pending non-provisional application by the same inventors as the instant application and filed on the same day as the instant application, entitled "Bone Conduction Designs in Wearable Electronic Devices," having Ser. No. 16/207,177, and filing date Dec. 12, 2018.

The subject matter of this application is also related to the subject matter in a co-pending non-provisional application by the same inventors as the instant application and filed on the same day as the instant application, entitled "On/Off Detection in Wearable Electronic Devices," having Ser. No. 16/207,182, and filing date Dec. 2, 2018

BACKGROUND

Field

The disclosure relates to wearable electronic devices. More specifically, the disclosure relates to hinge designs in wearable electronic devices.

Related Art

Wearable electronic devices are increasingly used to provide digital and/or electronic functionality to users in a variety of ways. For example, sensors, electronic components, and/or software may be integrated into watches, glasses, wristbands, jewelry, headsets, clothing, and/or shoes. In turn, hardware and/or software in the devices may be used to monitor heart rate, activity level, temperature, drowsiness, and/or other attributes of health or physical state; record and/or output images, audio, video, documents, messages, calls, notifications, vibrations, navigation cues, and/or other data or information; and/or execute applications or provide custom features to the users.

At the same time, integrating electronic components into wearable form factors may present a number of challenges. First, wires, printed circuit boards (PCBs), sensors, input/output (I/O) devices, and/or other electronic components must be placed within and/or throughout a wearable electronic device in a way that is unobtrusive, functional, and/or aesthetically pleasing. Second, the electronic components must be protected from and/or resistant to physical force, water, dust, overheating, and/or other environmental factors that may cause damage to the components and/or wearable electronic device.

Consequently, wearable technology may be improved by designs that incorporate electronic components and functionality into wearable form factors in a streamlined, stylish, unobtrusive, and/or functional manner.

SUMMARY

The disclosed embodiments provide a wearable electronic device. The wearable electronic device includes a frame containing a front portion configured to rest over a nose of a user, a first arm configured to rest over an ear of the user. The wearable electronic device also includes a first hinge connecting the front portion and the first arm. The first hinge includes an interior portion that houses a wire connected to a first electronic component in the front portion and a second electronic component in the first arm. The first hinge also includes an exterior portion that hides the wire during rotation of the first arm about the first hinge between a folded position and an unfolded position.

In one or more embodiments, the wearable electronic device also includes a second arm in the frame and a second hinge connecting the front portion and the second arm, wherein the first and second hinges include a first set of metal contacts for charging a battery in the wearable electronic device.

In one or more embodiments, the first and second hinges further include a second set of metal contacts for transferring data between the wearable electronic device and another electronic device.

In one or more embodiments, the second set of metal contacts include a first data contact on the first hinge and a second data contact on the second hinge.

In one or more embodiments, the first set of metal contacts include a power contact on the first hinge and a ground contact on the second hinge.

In one or more embodiments, the first hinge further includes an antenna coupled to the first or second electronic components.

In one or more embodiments, the antenna includes a molded interconnect device (MID).

In one or more embodiments, the wire includes a flexible printed circuit (FPC).

In one or more embodiments, the frame includes a plastic material and the hinge comprises a metal material.

In one or more embodiments, the hinge is coupled to a bend that extends backwards from a corner of the front portion of the frame.

In one or more embodiments, the wire is housed within the interior portion of the first hinge at a position that is offset from a center of the first hinge.

BRIEF DESCRIPTION OF THE DRAWINGS

In the figures, like elements are denoted by like reference numerals.

DETAILED DESCRIPTION

In the following detailed description, numerous specific details are set forth to provide a thorough understanding of the disclosed embodiments.

However, it will be apparent to those skilled in the art that the disclosed embodiments may be practiced without these specific details. In other instances, well-known features have not been described in detail to avoid unnecessarily complicating the description.

Methods, structures, apparatuses, modules, and/or other components described herein may be enabled and operated using hardware circuitry, including but not limited to transistors, logic gates, and/or electrical circuits such as application-specific integrated circuits (ASICs), field-programmable gate arrays (FPGAs), digital signal processors (DSPs), and/or other dedicated or shared processors now known or later developed. Such components may also be provided using firmware, software, and/or a combination of hardware, firmware, and/or software.

The operations, methods, and processes disclosed herein may be embodied as code and/or data, which may be stored on a non-transitory computer-readable storage medium for use by a computer system. The computer-readable storage medium may correspond to volatile memory, non-volatile memory, hard disk drives (HDDs), solid-state drives (SSDs), hybrid disk drives (HDDs), magnetic tape, compact discs (CDs), digital video discs (DVDs), and/or other media capable of storing code and/or data now known or later developed. When the computer system reads and executes the code and/or data stored on the computer-readable storage medium, the computer system performs the methods and processes embodied in the code and/or data.

The disclosed embodiments relate to the design and operation of a wearable electronic device. More specifically, the disclosed embodiments relate to bone conduction designs, hinge designs, and/or on/off detection in wearable electronic devices.

Figure 1:
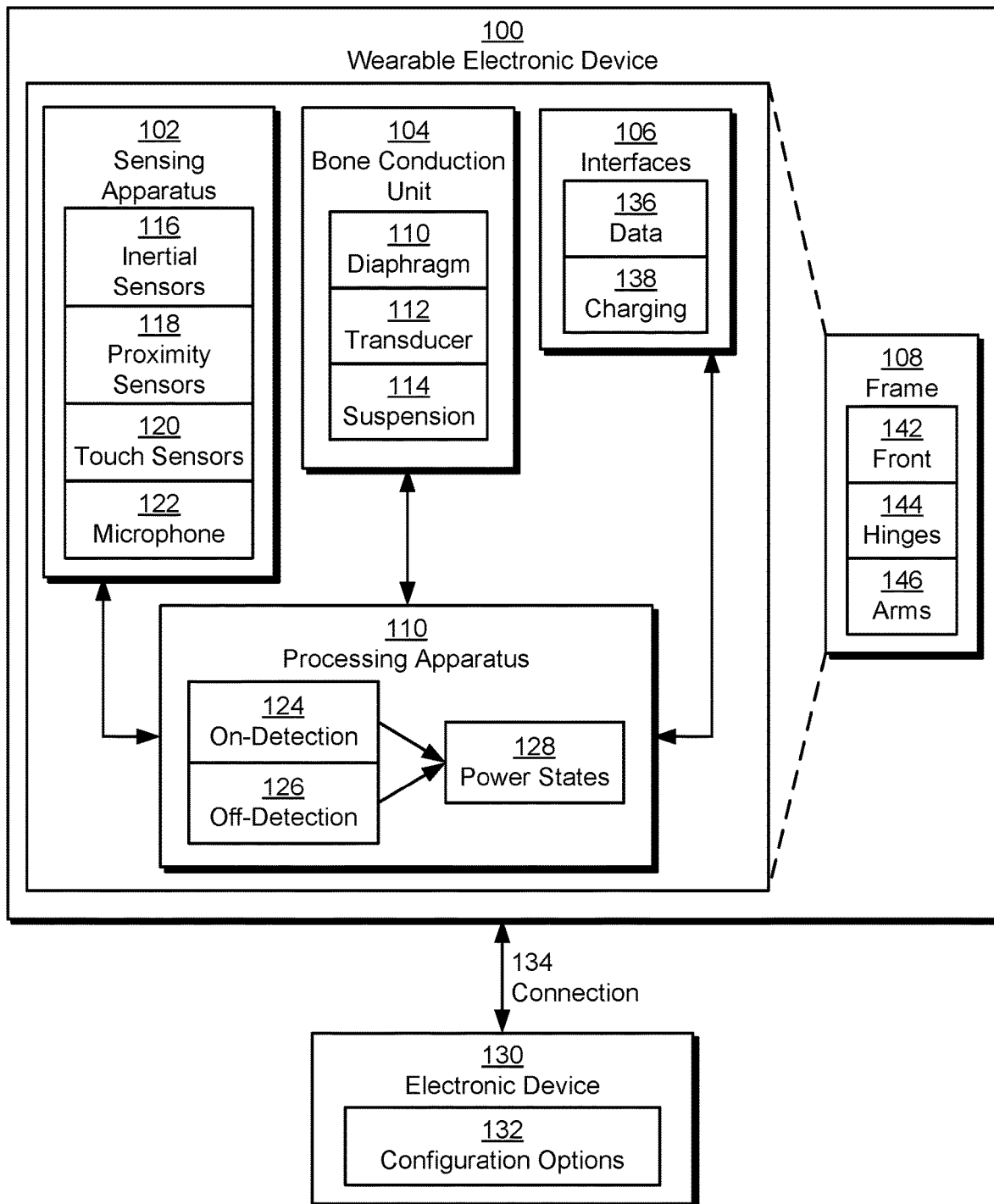
FIG. 1 shows a schematic of a wearable electronic device in accordance with one or more embodiments.

As shown in FIG. 1, a wearable electronic device 100 includes a frame 108 that contains a front 142 portion, one or more hinges 144, and one or more arms 146. Front 142 may be structured and/or configured to rest over a nose of a user, and arms 146 may be structured and/or configured to rest over one or more ears of the user. Hinges 144 may attach arms 146 to the outsides of front 142 so that each arm rotates between a folded position, in which the arm is tucked against front 142, and an unfolded position, in which the arm extends away from front 142 at around a 90-degree angle. Arms 146 may be folded when wearable electronic device 100 is stowed and/or not being worn and unfolded for placement of wearable electronic device 100 on the head of a user. As a result, wearable electronic device 100 may include an optical head-mounted display, wearable computer glasses, smartglasses, augmented reality system, virtual reality headset, helmet-mounted device, hat-mounted device, and/or other type of electronic device with a form factor that is compatible with placement on a user's head.

Frame 108 houses a number of components that provide functionality associated with wearable electronic device 100. First, frame 108 includes a sensing apparatus 102 containing a number of sensors that measure the environment around wearable electronic device 100. Within sensing apparatus 102, inertial sensors 116 such as accelerometers and/or gyroscopes may collect inertial data related to changes in the position, orientation, acceleration, and/or angular velocity of wearable electronic device 100 along one or more axes. The inertial data may be used to evaluate parameters associated with the user's head movements while wearable electronic device 100 is worn and/or the user's general motion (e.g., the speed of a vehicle driven by the user, the amount of time in which the user has been in a relatively stationary (e.g., sitting) position, the user's level of activity, etc.). The inertial data may also, or instead, be used to detect head gestures from the user (e.g., shaking, nodding, tilting, etc.).

Sensing apparatus 102 also includes proximity sensors 118 such as Hall effect sensors, reed switches, infrared sensors, and/or capacitive sensors. Proximity sensors 118 may be used to sense proximity of front 142, hinges 144, arms 146, and/or other components of frame 108 to one another, the user's head, and/or other objects. For example, proximity sensors 118 may include a capacitive sensor and/or infrared sensors in front 142 and/or arms 146, which can be used to detect placement of wearable electronic device 100 on the user's face or head. In another example, proximity sensors 118 may include a Hall effect sensor and/or reed switch in one arm of frame 108 and a magnet in another arm of frame 108. As arms 146 transition between a folded position and an unfolded the position, the output of the Hall effect sensor and/or configuration of the reed switch may change. In other words, the Hall effect sensor and/or reed switch may be used to detect folding and unfolding of arms 146 about hinges 144.

Sensing apparatus 102 further includes touch sensors 120 that receive touch input from the user. For example, sensing apparatus 102 may include a touchpad that is disposed along front 142 and/or arms 146. The user may interact with the touchpad to perform gestures such as tapping, double tapping, holding, swiping, scrolling, and/or multi-touch gestures.

Sensing apparatus 102 additionally includes a microphone 122 that detects audio near wearable electronic device 100. The user may speak into microphone 122 to interact with a natural language user interface associated with wearable electronic device 100, conduct phone calls, and/or perform other tasks. Microphone 122 may also, or instead, be used to collect sound that is not generated by the user to detect and/or analyze the environment around wearable electronic device 100. For example, ambient sound collected by microphone 122 may be used to predict the location of wearable electronic device 100 (e.g., indoors, outdoors, etc.), identify objects in proximity to wearable electronic device 100 (e.g., automobiles, machinery, animals, humans, etc.), and/or identify music or other audio playing in the vicinity of wearable electronic device 100.

Those skilled in the art will appreciate that sensing apparatus 102 may include functionality to collect other types of measurements. For example, sensing apparatus 102 may include a camera, Global Positioning System (GPS) receiver, magnetometer, temperature sensor, ambient light sensor, pressure sensor, rangefinder, biometric sensor, and/or another type of sensor.

Second, frame 108 includes a bone conduction unit 104. For example, bone conduction unit 104 may be disposed within one or more arms 146 of frame 108 at a position that contacts the user's head. Within bone conduction unit 104, a transducer 112 may generate sound that is conducted to the user's inner ear via the bones in the user's skull. For example, transducer 112 may be used to output music, audio from phone calls, recordings, synthesized speech, notifications and alerts, and/or other types of sound to the user's ear.

In one or more embodiments, bone conduction unit 104 is designed and/or placed to improve audio passthrough from transducer 112 to the user's inner ear and reduce unwanted sound leakage from transducer 112 to frame 108 and/or the air around bone conduction unit 104. More specifically, bone conduction unit 104 includes a suspension 114 that isolates one or more portions of transducer 112 from contacting frame 108, as well as a diaphragm 110 that is disposed over the top and/or sides of transducer 112 to efficiently conduct sound from transducer 112 to the user's head. Bone conduction designs in wearable electronic devices are described in further detail below with respect to FIGS. 3A-3C.

Third, frame 108 includes one or more interfaces 106 between wearable electronic device 110 and another electronic device 130. For example, interfaces 106 may allow wearable electronic device 100 to be paired with electronic device 130 via a Bluetooth (Bluetooth™ is a registered trademark of Bluetooth SIG, Inc.), near field communication (NFC), Wi-Fi Direct (Wi-Fi Direct™ is a registered trademark of Wi-Fi Alliance Corp.), Universal Serial Bus (USB), and/or another type of wired or wireless connection 134.

Once communication between wearable electronic device 100 and electronic device 130 is established, a user may interact with electronic device 130 through wearable electronic device 100 by providing input through microphone 122, inertial sensors 118, touch sensors 120, and/or other input devices on wearable electronic device 100. For example, the user may speak voice commands into microphone 122 to interact with a natural language user interface on a mobile phone, tablet computer, laptop computer, motor vehicle, navigation system, charging case, dock, smartwatch, fitness tracker, game console, portable media player, and/or other electronic device 130 to which wearable electronic device 100 is paired. The user may also, or instead, generate gestures using touch sensors 120 and/or inertial sensors 118 to interact with a touch and/or touchless user interface on wearable electronic device 100 and/or electronic deice 130. Wearable electronic device 100 may relay the voice commands and/or gestures to electronic device 130 through connection 134, and electronic device 130 may generate visual, audio, and/or tactile output in response to the voice commands and/or gestures. Alternatively, electronic device 130 may transmit, in response to the voice commands and/or gestures, one or more commands to wearable electronic device 100, and wearable electronic device 100 may use bone conduction unit 104 and/or other output devices to generate output reflecting the commands.

The user may also use connection 134 to configure the operation of wearable electronic device 100 from electronic device 130. For example, the user may interact with a touchscreen, keyboard, set of buttons, voice user interface, and/or other input device on electronic device 130 to specify one or more configuration options 132 for wearable electronic device 100.

Configuration options 132 may be obtained using an application (e.g., a mobile application) in electronic device 130 and used by electronic device 130 and/or wearable electronic device 100 to modify the behavior of wearable electronic device 100. For example, configuration options 132 may be transmitted from electronic device 130 over connection 134 to wearable electronic device 100, and wearable electronic device 100 may process input from sensing apparatus 102 and/or another input device and/or generate output on bone conduction unit 104 and/or another output device based on configuration options 132.

Conversely, configuration options 132 may be stored locally on electronic device 130 and used by electronic device 130 to modify the operation of wearable electronic device 100. For example, electronic device 130 may use connection 134 to obtain input collected from input devices on wearable electronic device 100, process the input based on configuration options 132, and/or generate output on electronic device 130 and/or wearable electronic device 100 based on the processed input.

In particular, interfaces 106 may be used to transfer data 136 between wearable electronic device 100 and electronic device 134 and/or perform charging 138 of wearable electronic device 100 from electronic device 134. For example, data 136 such as images, audio, video, documents, emails, messages, and/or commands may be transmitted between wearable electronic device 100 and electronic device 130 over a Universal Serial Bus (USB), Bluetooth, WiFi, NFC, and/or another type of wired or wireless communication protocol. In another example, charging 138 of a battery in wearable electronic device 100 may be performed via a power source supplied by electronic device 130, a power supply on wearable electronic device 100 and/or electronic device 100, and/or a set of charging contacts and/or wires that electrically couple wearable electronic device 100 to electronic device 130.

In one or more embodiments, hinges 144 include one or more portions of interfaces 106 for transferring data 136 and/or performing charging 138 of wearable electronic device 100. For example, hinges 144 may include a power contact and a ground contact for charging 138 wearable electronic device 100 and/or data contacts or an antenna for transferring data 136 over a wired or wireless interface between wearable electronic device 100 and electronic device 130. Hinges 144 may additionally be designed to hide wires that connect electronic components within wearable electronic device 100. Hinge designs for wearable electronic devices are described in further detail below with respect to FIGS. 4A-4C.

Moreover, a processing apparatus 110 in wearable electronic device 100 includes functionality to perform on-detection 124 and off-detection 126 in wearable electronic device 100. On-detection 124 may include detecting the wearing of wearable electronic device 100 by a user (e.g., placement of wearable electronic device 100 on the user's face or head), and off-detection 126 may include detecting wearable electronic device 100 in an unworn state (e.g., removal of wearable electronic device 100 from the user's face or head).

To perform on-detection 124 and off-detection 126, processing apparatus 110 may analyze measurements from a variety of inertial sensors 116, proximity sensors 118, touch sensors 120, microphone 122, and/or other sensors or input devices in sensing apparatus 102. During a first step of on-detection 124, processing apparatus 110 may identify measurements that indicate unfolding of arms 146 in frame 108. For example, processing apparatus 110 may use changes in readings from one or more proximity sensors 118 to detect a change in the position of arms 146 from a folded position to an unfolded position. Such proximity sensors 118 may include a Hall effect sensor in one arm and a magnet in another arm, a reed switch in one arm and a magnet in another arm, infrared sensors along the inside and/or outside of one or both arms 146, electrical contacts in frame 108 that contact one another when arms 146 are unfolded, switches in frame 108 that are triggered when arms 146 are unfolded, and/or other sensors that are capable of detecting a change in the position of arms 146. In another example, processing apparatus 110 may use inertial sensors 116 in arms 146 to detect motion and/or angular velocity that indicates an unfolding motion in arms 146 and/or an outward rotation of hinges 144.

During a second step of on-detection 124, processing apparatus 110 may identify measurements indicating placement of wearable electronic device 100 on the user's face or head. To perform the second step, processing apparatus 110 may use readings from sensors in sensing apparatus 102 to detect an upward sweeping motion of wearable electronic device 100, followed by the proximity of the insides of arms 146 and/or frame 108 to a surface and/or an increase in the motion of wearable electronic device 100.

For example, processing apparatus 110 may use inertial sensors 116 to track the upward sweeping motion as a change in tilt of wearable electronic device 100 from pointing down to pointing forward, as well as an upward and backward displacement of wearable electronic device 100. Next, processing apparatus 110 may use infrared sensors along the insides of one or more arms 146, a capacitive sensor along a nose bridge in front 142 and/or the insides of arms 146, and/or other types of proximity sensors 118 in sensing apparatus 102 to detect the proximity of the inside of frame 108 to a surface (e.g., the user's head). Processing apparatus 110 may also, or instead, use a strain gauge disposed within and/or near one or more arms 146 and/or other portions of frame 108 to detect an increase in pressure applied to the inside of frame 108 as wearable electronic device 100 is worn on the user's head. Processing apparatus 110 may then use the root mean square of displacement measurements from inertial sensors 116 to detect a "nudge" or "wobble" as wearable electronic device 100 transitions from being in motion (e.g., as wearable electronic device 100 is moved toward the user's head) to being relatively still (e.g., on the user's head). Finally, processing apparatus 110 may use inertial sensors 116 to detect head movements as wearable electronic device 100 is worn. After both steps of on-detection 124 have been completed, processing apparatus 110 may determine that wearable electronic device 100 is being worn by the user.

Conversely, processing apparatus 110 may perform a series of steps in off-detection 126 in the reverse order in which the steps in on-detection 124 are performed. During a first step of off-detection 126, processing apparatus 110 may use readings from sensing apparatus 102 to detect removal of wearable electronic device 100 from the user's head or face as an downward sweeping motion of wearable electronic device 100, a lack of proximity of the insides of arms 146 and/or frame 108 to a surface, and/or a decrease in the motion of wearable electronic device 100 (e.g., after wearable electronic device 100 is placed on a table or other stationary surface). During a second step of off-detection 126, processing apparatus 110 may use additional readings from sensing apparatus 102 to detect a change in the position of arms 146 from the unfolded position to the folded position.

In turn, processing apparatus 110 may manage power states 128 in wearable electronic device 100 based on on-detection 124 and off-detection 126 instead of requiring the user to interact with a power button, power switch, and/or other component to manually turn wearable electronic device 100 on and off. When unfolding of arms 146 is detected, processing apparatus 110 may initiate a power-on sequence that supplies or increases power to electronic components in wearable electronic device 100 from a battery in wearable electronic device 100. The power-on sequence may thus initialize or enable functionality that is provided by the electronic components.

When placement of wearable electronic device 100 on a user's head is subsequently detected, processing apparatus 110 may increase power to the electronic components and/or generate output (e.g., a light, a sound, a vibration, a command to electronic device 130, etc.) that indicates or confirms that wearable electronic device 100 is in a fully powered state. Once wearable electronic device 100 is in the fully powered state, the user may access full functionality provided by wearable electronic device 100 by providing input to inertial sensors 116, touch sensors 120, microphone 122, and/or other input devices in wearable electronic device 100 and/or receiving output from bone conduction unit 104 and/or other output devices in wearable electronic device 100. For example, the user may interact with wearable electronic device 100 to listen to music, conduct phone calls, receive navigation cues, and/or receive notifications while wearable electronic device 100 is worn and in the fully powered state.

After removal of wearable electronic device 100 from the user's head is detected, processing apparatus 110 may reduce power supplied from the battery to electronic components in wearable electronic device 100. For example, processing apparatus 110 may place wearable electronic device 100 into a "sleep" or "standby" mode and/or power down wearable electronic device 100 after wearable electronic device 100 remains in an unworn state for a pre-specified period (e.g., a number of seconds or minutes). As discussed above, the unworn state may be established and/or tracked based on the folding of arms 146, a change or reduction in movement as detected by inertial sensors 116, and/or a lack of proximity of the inside of frame 108 to a surface as detected by proximity sensors 118.

Consequently, processing apparatus 110 may leverage the user's natural interaction with the form factor of wearable electronic device 100 (e.g., putting wearable electronic device 100 on or taking wearable electronic device 100 off) to automatically transition wearable electronic device 100 between power states 128, thereby allowing wearable electronic device 100 to omit a dedicated power button or on-off switch. In turn, processing apparatus 110 and/or wearable electronic device 100 may provide a more seamless user experience than devices that require users to manually interact with power buttons and/or on-off switches to turn the devices on and off.

Those skilled in the art will appreciate that various steps and/or techniques for performing on-detection 124, off-detection 126, and/or management of power states 128 may be adjusted to accommodate different types and/or combinations of sensors in sensing apparatus 102. For example, processing apparatus 110 may omit detecting the folding and/or unfolding of arms 146 in on-detection 124 and/or off-detection 126 when infrared sensors, capacitive sensors, and/or other proximity sensors 118 on the inside of frame 108 can be used to detect placement of wearable electronic device 100 on the user's face or head. In another example, a series of measurements from inertial sensors 116 may be used to perform on-detection 124 and off-detection 126, in lieu of or in addition to measurements from proximity sensors 118 and/or other sensors in wearable electronic device 100.

Processing apparatus 110 and/or another component of wearable electronic device 100 may perform additional tracking and/or analysis related to on-detection 124, off-detection 126, and/or analysis of other types of readings from sensing apparatus 102. For example, the component may use on-detection 124, off-detection 126, and/or charging 138 states to track metrics related to wearing or use of wearable electronic device 100 by the user (e.g., number of hours per day or week, average duration of wear, longest duration of wear, average battery life, battery health, etc.). In another example, the component may monitor readings from inertial sensors 116 while the user wears wearable electronic device 100 to assess the user's activity level (e.g., steps, calories burned, distance covered, etc.) and/or types of activity (e.g., walking, running, climing stairs, cycling, etc.) on a periodic (e.g., hourly, daily, weekly, etc.) basis. The user may interact with wearable electronic device 100 and/or electronic device 130 to view results, set goals or limits, and/or access applications related to the metrics, activity types, and/or activity level.

Figure 2:
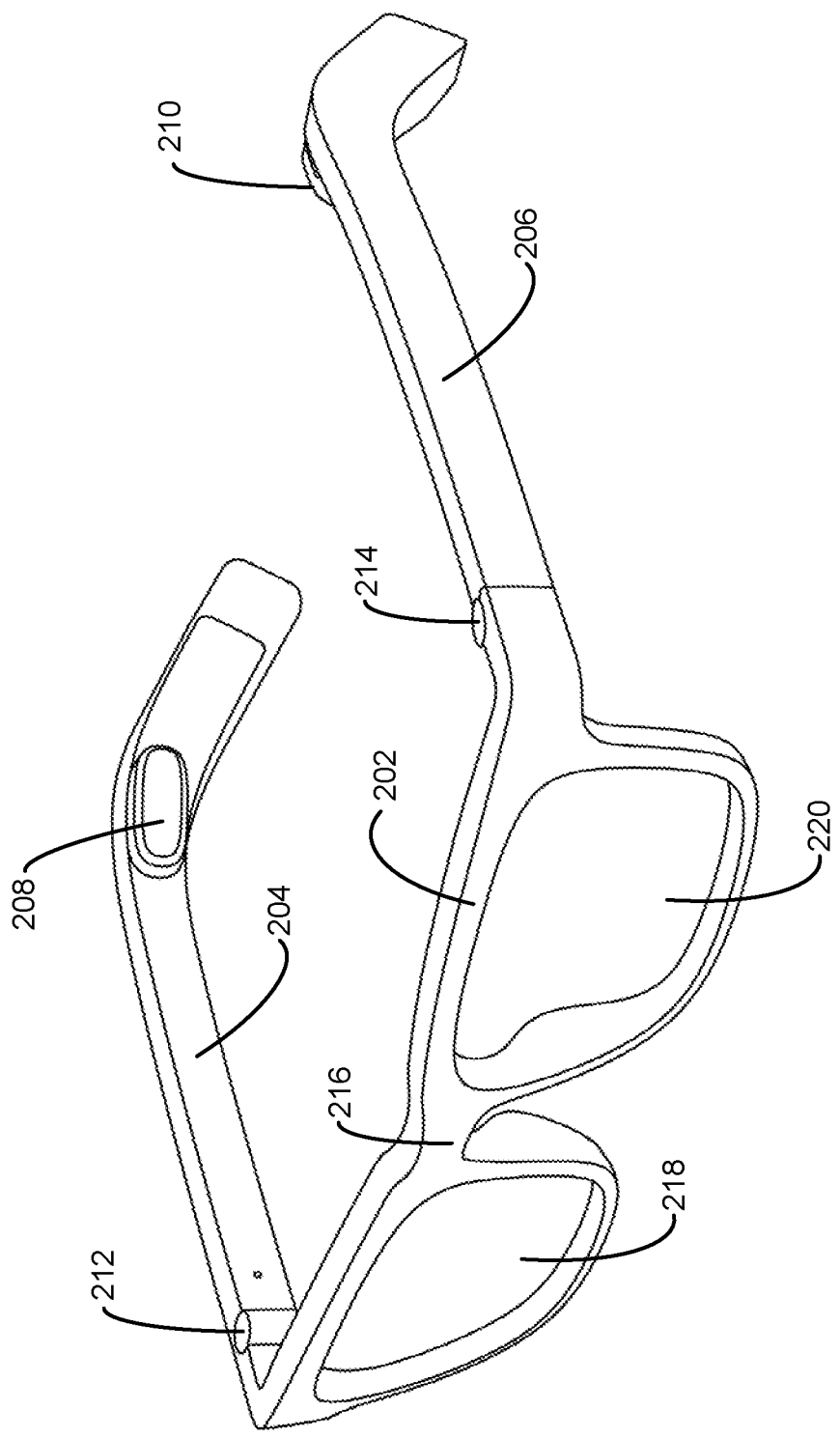
FIG. 2 shows an example wearable electronic device in accordance with one or more embodiments.

FIG. 2 shows an example wearable electronic device (e.g., wearable electronic device 100 of FIG. 1) in accordance with one or more embodiments. As shown in FIG. 2, a frame of the wearable electronic device includes a front 202 portion and two arms 204-206. Front 202 includes a bridge 216 that is configured to fit over a user's nose, as well as lenses 218 (e.g., prescription lenses, colored lenses, plano lenses, etc.) that are held in front of the user's eyes when the wearable electronic device is worn on the user's face. As a result, the wearable electronic device may have a form factor that resembles eyeglasses and/or sunglasses.

A hinge 212 connects arm 204 to front 202, and another hinge 214 connects arm 206 to front 202. Hinges 212-214 allow arms 204-206 to rotate between a folded position, in which the angle between each arm and front 202 is minimized, and an unfolded position, in which the angle between each arm and front 202 is increased (e.g., to a maximum of approximately 90 degrees). As described in further detail below with respect to FIGS. 4A-4C, hinges 212-214 may include functionality to hide wires connecting electrical components in arms 204-206 to electrical components in front 202, transfer data between the wearable electronic device and another electronic device (e.g., electronic device 130 of FIG. 1), and/or charge a battery in the wearable electronic device.

The wearable electronic device of FIG. 2 also includes a bone conduction unit 208 disposed within arm 204, and another bone conduction unit 210 disposed within arm 206. Bone conduction units 206-208 may be positioned to contact a specific region of a user's head when the wearable electronic device is worn by the user. For example, bone conduction units 206-208 may be designed to touch the user's head near (e.g., in front of) attachment points of the tops of the user's ears while the wearable electronic device is worn. As described in further detail below with respect to FIGS. 3A-3C, bone conduction units 206-208 may include additional structures that improve the passthrough of sound to the user's inner ear while reducing sound leakage to the frame and/or air around the wearable electronic device.

Figure 3A:
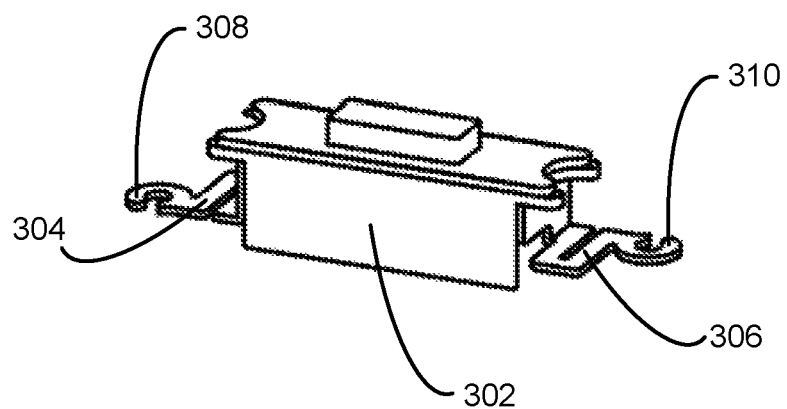
FIG. 3A shows a portion of a bone conduction unit in a wearable electronic device in accordance with one or more embodiments.

FIG. 3A shows a portion of a bone conduction unit (e.g., bone conduction unit 104 of FIG. 1) in a wearable electronic device in accordance with one or more embodiments. More specifically, FIG. 3A includes a bone conduction transducer 302 that vibrates to generate sound, as well as a suspension containing a first portion 304 attached to one side of transducer 302 and a second portion 306 attached to another side of transducer 302. For example, portions 304-306 may include bronze, stainless steel, brass, and/or other metal components that are welded, glued, and/or otherwise joined or affixed to the sides of transducer 302.

Portions 304-306 may isolate at least one surface of transducer 302 from contacting a frame of a wearable electronic device (e.g., wearable electronic device 100 of FIG. 1). As shown, portions 304-306 may include attachment points 308-310 that are distal to the center of transducer 302. Attachment points 308-310 may be affixed to an enclosure within the frame so that transducer 302 is suspended within the frame, thereby preventing the center and/or bottom of transducer 302 (which generate the most vibrations) from contacting the frame. Portions 304-306 may also include a zigzag shape that further dampens transmission of vibrations from the sides of transducer 302 (which vibrate less than the center of transducer 302) to the frame via attachment points 308-310.

Figure 3B:
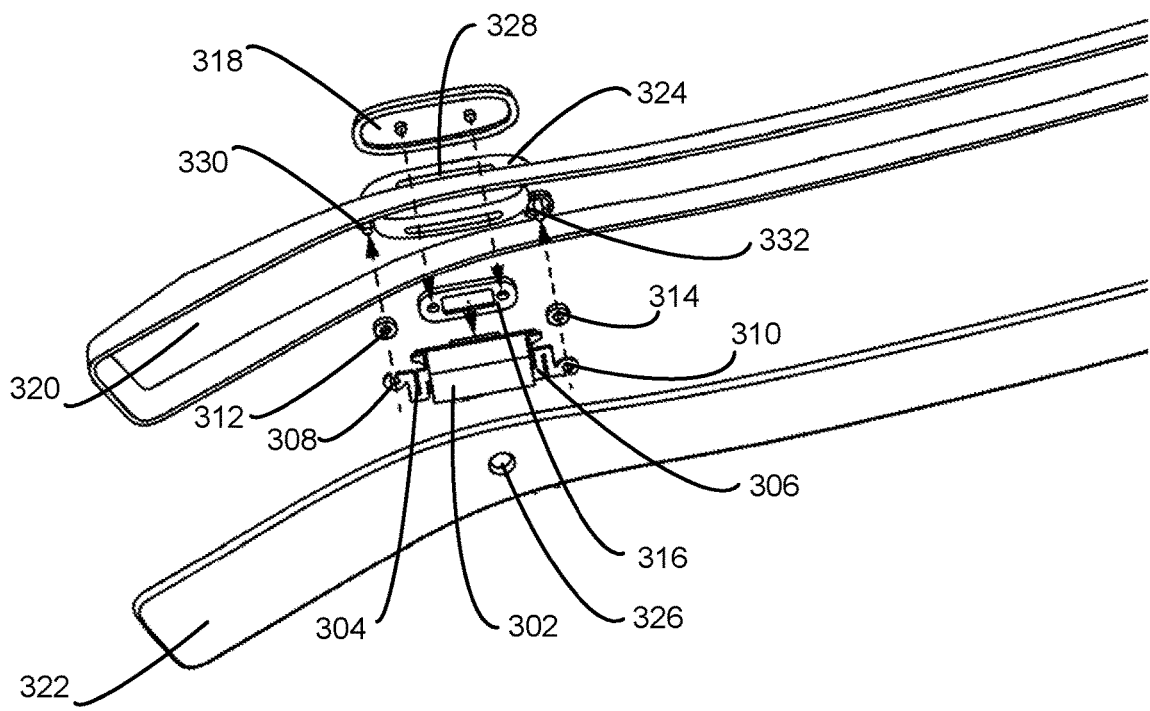
FIG. 3B shows an exploded view of a bone conduction unit disposed in a frame of a wearable electronic device in accordance with one or more embodiments.
Figure 3C:
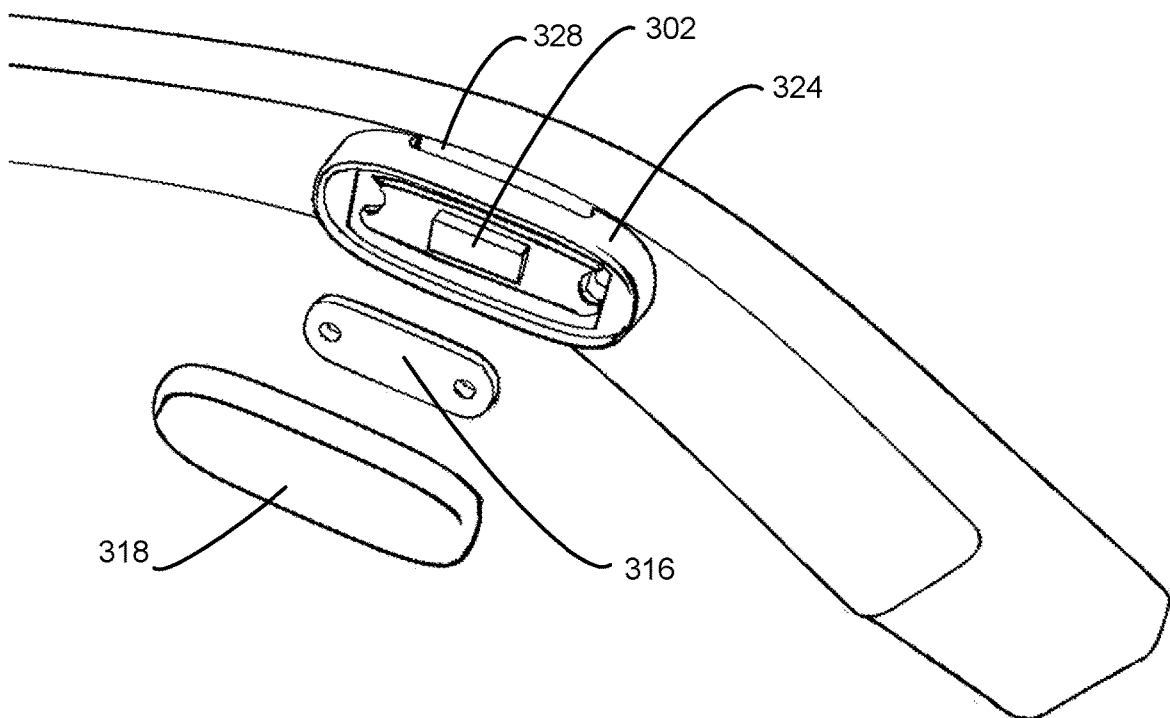
FIG. 3C shows an exploded view of a bone conduction unit disposed in a frame of a wearable electronic device in accordance with one or more embodiments.

FIGS. 3B-3C show exploded views of the bone conduction unit of FIG. 3A disposed in a frame of a wearable electronic device in accordance with one or more embodiments. As shown in FIG. 3B, transducer 302 and portions 304-306 of the suspension are disposed between one portion 320 of the frame that faces inwards and another portion 322 of the frame that faces outwards. For example, portions 320-322 may form an arm in the wearable electronic device, with portion 320 contacting the side of a user's head while the wearable electronic device is worn and portion 322 facing away from the side of the user's head while the wearable electronic device is worn.

Attachment points 308-310 of portions 304-308 may be mounted to corresponding attachment points 330-332 of portion 320. For example, attachment points 308-310 may include hollow portions that accommodate peg-like structures formed in attachment points 330-332 of the frame. Transducer 302 and portions 304-306 may be secured within the frame by applying a hot meld and/or other type of adhesive or joining technique to the interface between attachment points 308-310 and attachment points 330-332.

To further dampen transmission of vibrations from transducer 302 to the frame, components 312-314 made of a soft material may be disposed between attachment points 308-310 and attachment points 330-332 before the adhesive and/or joining technique is applied. For example, components 312-314 may include rings formed from soft rubber and/or silicone that are threaded through the peg-like structures in attachment points 330-332 between attachment points 308-310 and portion 320. As a result, components 312-314 may form a physical barrier that reduces the propagation of vibrations produced by transducer 302 to the frame through attachment points 308-310 and attachment points 330-332.

In addition, portion 320 includes an enclosure 324 that houses transducer 302 and facilitates the conduction of sound from transducer 302 to the portion of the user's head that is in contact with the bone conduction unit. As shown in FIGS. 3B-3C, a top of enclosure 324 includes an opening that allows vibrations from transducer 302 to be transmitted as sound to a user's inner ear through the top of transducer 302. One or more components 316-318 of a diaphragm may additionally be disposed over the top of transducer 302 and/or enclosure 324 to further facilitate the transmission of vibrations from transducer 302 to the user's head. Component 316 may include a hard plastic material that is disposed over the top of transducer 302, and component 318 may include a soft rubber and/or silicone material that is disposed over component 316 to interface with the user's head when the wearable electronic device is worn. Component 318 may additionally be formed into a cap that extends over the top of the bone conduction unit and along at least a portion of the sides of the bone conduction unit and/or enclosure 324.

Components 316-318 may be affixed to the bone conduction unit using adhesive, mechanical fasteners, and/or another technique. The harder material in component 316 may efficiently conduct sound from transducer 302 to the user's head, and the physical isolation of component 316 from the frame may reduce sound leakage from transducer 302 to the frame. At the same time, the softer material in component 318 may improve sound passthrough from transducer 302 to the user's head by increasing contact between the bone conduction unit and the user's head.

Finally, openings 326-328 may be formed in one or more portions 320-322 of the frame and/or enclosure 324 to further reduce sound leakage from transducer 302. For example, openings 326-328 may be formed in parts of the frame and/or enclosure 324 that are adjacent to one or more surfaces of transducer 302 to reduce contact between transducer 302 and the frame and/or to dissipate vibrations generated by transducer 302. Openings 326-328 may include holes, slits, and/or other shapes that are cut into portions 320-322 and/or enclosure 324. Additional openings (not shown) may optionally be included in one or more components 316-318 of the diaphragm to further reduce sound leakage through the diaphragm and/or frame.

To prevent foreign particles from entering the frame, a film may be disposed over openings 326-328. For example, the film may include a semi-permeable material that acts as a barrier against dust and/or moisture while allowing air to pass through the film. Like other parts of the frame, the film may be isolated from physical contact with transducer 302 to reduce sound leakage through the frame.

Those skilled in the art will appreciate that various materials may be used to increase sound passthrough and/or reduce sound leakage in the bone conduction unit. For example, materials that can be used reduce sound leakage from transducer 302 may include, but are not limited to, silicone, ethylene-vinyl acetate (EVA), foam, sorbothane, thermoplastic polyurethane (TPU), thermoplastic elastomer (TPE), clay, felt, aerogel, wood, and/or fabric. Such materials can be used in various locations, including, but not limited to, between the bottom of transducer 302 and the frame; between a side of transducer 302 and the frame; between attachment points 308-310 and attachment points 330-332; and/or in one or more layers of the diaphragm.

Figure 4A:
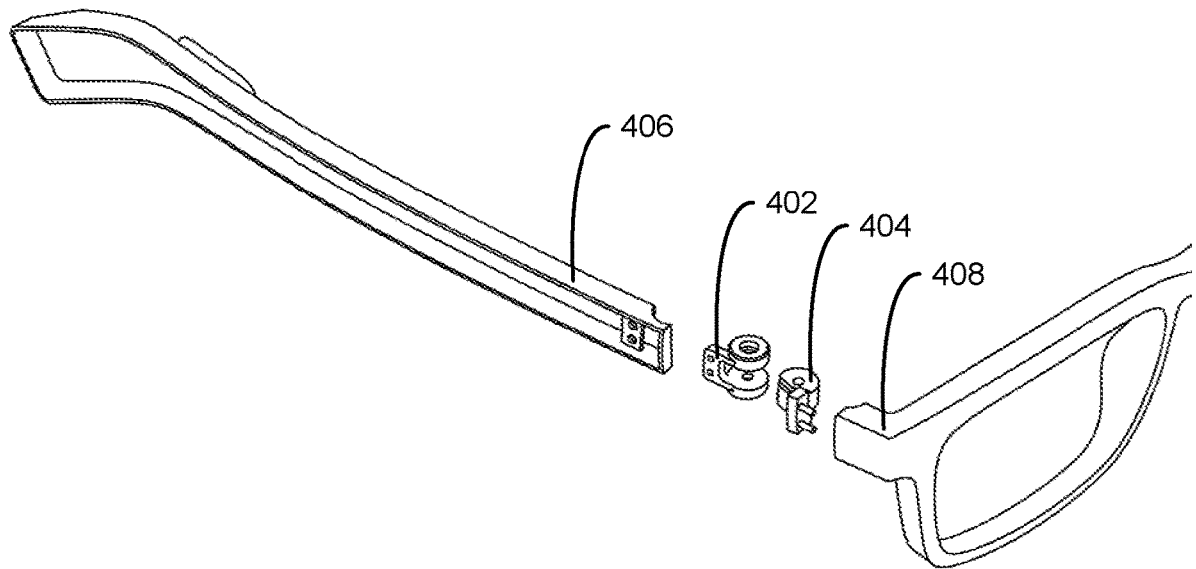
FIG. 4A shows an exploded view of a hinge in a frame of a wearable electronic device in accordance with one or more embodiments.
Figure 4B:
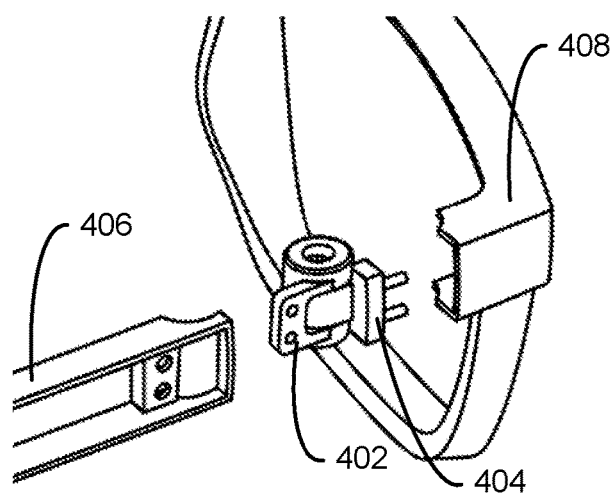
FIG. 4B shows an exploded view of a hinge in a frame of a wearable electronic device in accordance with one or more embodiments.
Figure 4C:
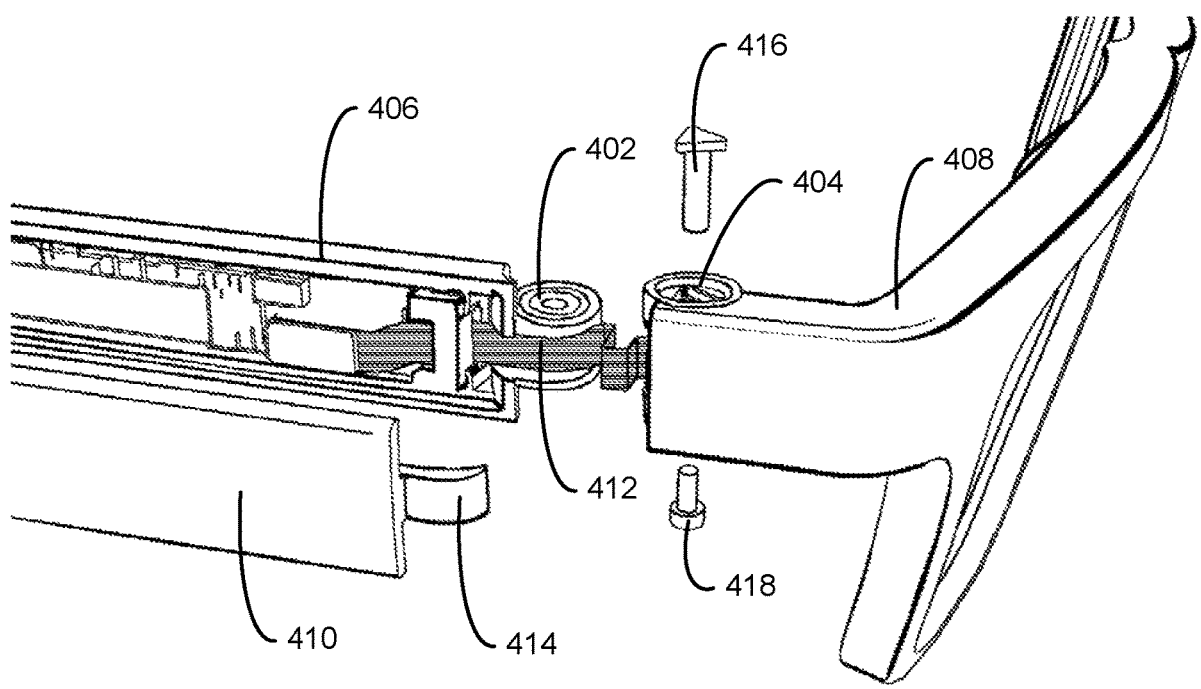
FIG. 4C shows an exploded view of a hinge in a frame of a wearable electronic device in accordance with one or more embodiments.

FIGS. 4A-4C shows exploded views of a hinge (e.g., hinges 144 of FIG. 1) in a frame of a wearable electronic device in accordance with one or more embodiments. As shown in FIGS. 4A-4B, the hinge includes a first portion 402 and a second portion 404 that connect two portions 406-408 of a frame for the wearable electronic device. For example, portions 402-404 of the hinge may allow an arm that includes an interior portion 406 (e.g., a portion that contacts a user's head or face while the wearable electronic device is worn) to rotate between a folded position, in which the arm is tucked in against a front portion 408 of the frame, and an unfolded position, in which the arm is extended at a roughly 90 degree angle from the corner of portion 408. The rotation of the arm about the front portion 408 may be enabled by rotating portion 402 about an axis provided by portion 404.

To reduce pressure on the hinge during folding and unfolding of the arm about the front portion 408, the hinge may be coupled to a bend that extends backwards from front portion 408 instead of at a corner formed from an intersection of portion 406 with portion 408. As a result, outward rotational force applied to the arm (e.g., during unfolding of the arm and/or wearing of the wearable electronic device) may be distributed along front portion 408 instead of at the corner and/or a conventional placement of the hinge at the corner, which could increase the susceptibility of the hinge to breaking.

Because portions 402-404 of the hinge are physically distinct from other portions 406-408 of the frame, materials used in portions 402-404 may be selected to provide functionality associated with the wearable electronic device, independently of materials selected for use in portions 406-408. First, one or both portions 402-404 may include copper, stainless steel, nickel alloy, and/or another type of metal to form metal contacts at the top, bottom, and/or sides of the hinge. Corresponding metal contacts may also be formed at another hinge (not shown) that connects a different arm to another corner of portion 408.

Metal contacts formed in hinges of the wearable electronic device may be used to connect the wearable electronic device to an external power source and/or charge a battery in the wearable electronic device from the external power source. For example, one hinge of the wearable electronic device may include a power contact, and another hinge of the wearable electronic device may include a ground contact. To charge the battery, the wearable electronic device may be placed in a carrying case and/or dock containing magnetic contacts that align with the hinges, and power may be supplied to the battery via the power contact, ground contact, magnetic contacts in the case or dock, and a power source connected to the magnetic contacts.

The metal contacts may also, or instead, be used to transfer data over a wired connection between the wearable electronic device and another electronic device (e.g., electronic device 130 of FIG. 1). For example, data may be transmitted between the wearable electronic device and the other electronic device over one data contact in one hinge of the wearable electronic device and another data contact in the other hinge of the wearable electronic device.

To enable both charging and data transfer through hinges of the wearable electronic device, each hinge may include two metal contacts (e.g., one on the top of the hinge and one on the bottom of the hinge). One metal contact in each hinge may be used to charge the wearable electronic device, and the other metal contact in each hinge may be used to transfer data over a wired connection between the wearable electronic device and the other electronic device.

In lieu of or in addition to metal contacts, one or both portions 402-404 of the hinge may include a molded interconnect device (MID) that forms an antenna in the wearable electronic device. The antenna may be manufactured using a laser direct structuring (LDS) technique that engraves a circuit trace onto a thermoplastic material. The antenna may also, or instead, include metal components that are formed within one or both portions 402-404 of the hinge. In turn, the antenna may allow the wearable electronic device to send and receive data over a Bluetooth, WiFi, and/or other type of wireless interface.

Those skilled in the art will appreciate that additional functionality may be provided by one or both hinges in the wearable electronic device. For example, one or both hinges may include a button that can be used to switch the wearable electronic device on and off, trigger the capture of images from a camera in the wearable electronic device, accept incoming phone calls, play or pause music or other audio, and/or access other features in the wearable electronic device. In another example, one or both hinges may include a mechanical switch and/or metal contacts that are used to detect unfolding of the arms in the wearable electronic device. As a result, the switch and/or metal contacts may be used to perform on-detection and/or off-detection in the wearable electronic device, as described above.

In addition, the hinge may be designed to hide a wire that connects one or more electronic components in portion 406 to one or more electronic components in portion 408. As shown in FIG. 4C, a flexible printed circuit (FPC) 412 and/or other type of wire is routed around one or both portions 402-404 of the hinge in an off-center position. FPC 412 may wrap around the hinge as the arm rotates between the folded and unfolded position. After FPC 412 is disposed within the hinge and/or the inside of the frame, portions 402-404 of the hinge may be secured using a screw nut 416, a screw 418, and/or another type of mechanical fastener.

Those skilled in the art will appreciate that FPC 412 may be routed and/or placed within the frame and/or hinge in other ways. For example, the hinge may include a hollow interior that allows FPC 412 to be routed through the center of the hinge instead of around the center of the hinge. As a result, portions (e.g., portions 402-404) of the hinge may be attached to one another using snap-fit connectors, mechanical fasteners that do not fully extend through the hinge, and/or other attachment techniques that accommodate the hollow interior.

An external portion 410 of the arm (e.g., a portion that faces away from the user's head or face while the wearable electronic device is worn) may then be placed over FPC 412 and/or other electronic components in the arm. A cap 414 in portion 410 may hide FPC 412 as the arm rotates about the hinge between the folded and unfolded positions.

Figure 5:
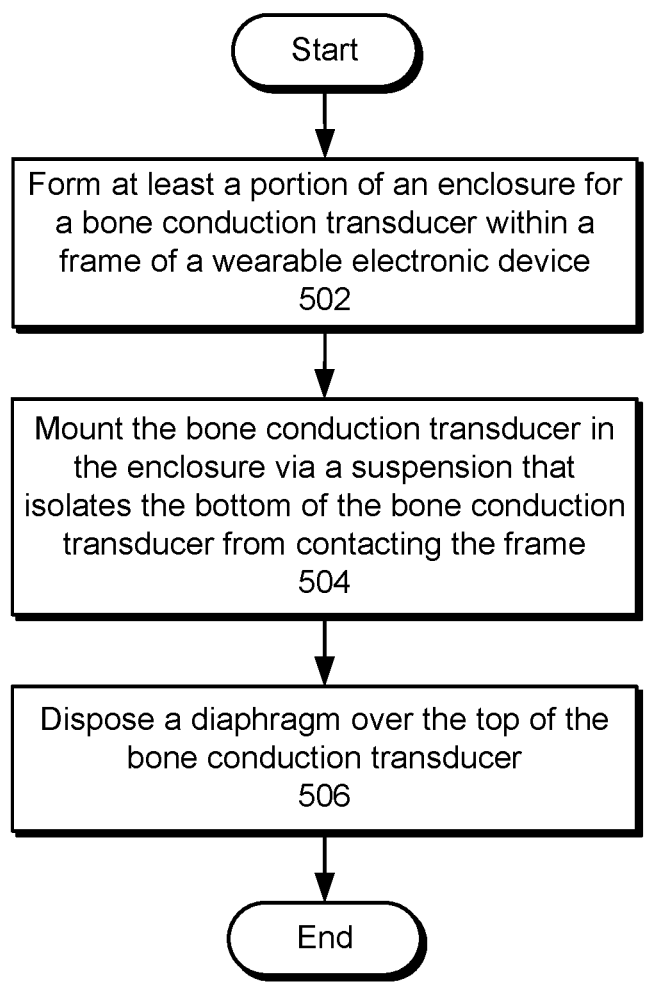
FIG. 5 shows a flowchart of assembling a bone conduction unit in a wearable electronic device in accordance with one or more embodiments.

FIG. 5 shows a flowchart of assembling a bone conduction unit in a wearable electronic device in accordance with one or more embodiments. In one or more embodiments, one or more of the steps may be omitted, repeated, and/or performed in a different order. Accordingly, the specific arrangement of steps shown in FIG. 5 should not be construed as limiting the scope of the embodiments.

First, at least a portion of an enclosure for a bone conduction transducer is formed within a frame of a wearable electronic device (operation 502). For example, the frame and/or enclosure may include an opening that exposes the top of the bone conduction transducer, as well as one or more attachment points for a suspension in the bone conduction unit. The frame and/or enclosure may include additional openings that are adjacent to surfaces of the bone conduction transducer to reduce sound leakage from the bone conduction unit to the frame. The openings may be covered by a semi-permeable film to prevent dust, moisture, and/or other foreign particles from entering the frame.

Next, the bone conduction transducer is mounted in the enclosure via a suspension that isolates the bottom of the bone conduction transducer from contacting the frame (operation 504). For example, the suspension may include one or more zigzag shapes that dampen the transmission of vibrations from the bone conduction transducer to the frame. Each zigzag shape may include a first attachment point that is joined to the side of the bone conduction transducer and a second attachment point that is distal to the center of the bone conduction transducer and joined to an arm of the wearable electronic device. A soft rubber and/or silicone material may be disposed between the second attachment point in the suspension and the corresponding attachment point in the frame to further dampen the transmission of vibrations from the transducer to the frame. By suspending the transducer within the enclosure and/or frame, the suspension and attachment points may prevent the center of the transducer, which vibrates more than the sides of the transducer, from physically contacting the frame and causing unwanted sound leakage.

A diaphragm is then disposed over a top of the bone conduction transducer (operation 506). For example, the diaphragm may include a plastic material that is disposed over the top of the transducer without contacting the frame, as well as a soft rubber material that is placed over the plastic material. The plastic material may efficiently conduct sound from the transducer to a user's head without increasing sound leakage from the transducer to the frame, while the soft rubber material may increase contact between the bone conduction unit and a part of the user's head near the attachment point of the top of the user's ear to the head.

Figure 6:
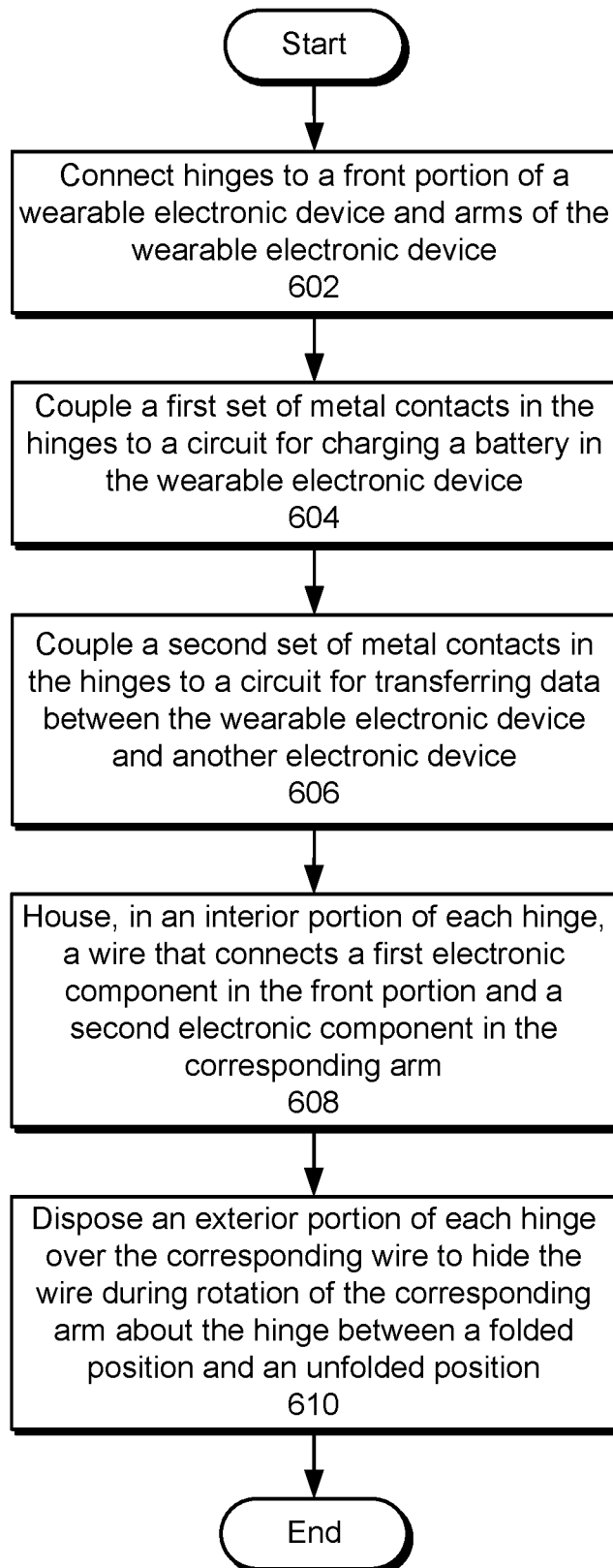
FIG. 6 shows a flowchart of assembling a wearable electronic device in accordance with one or more embodiments.

FIG. 6 shows a flowchart of assembling a wearable electronic device in accordance with one or more embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, hinges are connected to a front portion of the wearable electronic device and arms of the wearable electronic device (operation 602). For example, each hinge may be coupled to a bend that extends backwards from a different corner of the front portion of a plastic frame in the wearable electronic device. Each hinge may also be connected to an arm that is designed to rest over an ear of the user and/or rotate about the hinge between a folded position and an unfolded position.

Next, a first set of metal contacts in the hinges are coupled to a circuit for charging a battery in the wearable electronic device (operation 604), and a second set of metal contacts in the hinges are coupled to another circuit for transferring data between the wearable electronic device and another electronic device (operation 606). For example, each hinge may include two metal contacts; the first set of metal contacts may include a power contact on one hinge and a ground contact on the other hinge, and the second set of metal contacts may include one data contact on one hinge and another data contact on another hinge. The wearable electronic device may then be placed into a dock and/or carrying case containing magnetic contacts that align with the metal contacts in the hinges. The magnetic contacts may be connected to a power source and/or another electronic device to enable charging of the battery on the wearable electronic device from the power source and/or data transfer between the wearable electronic device and the other electronic device. The wearable electronic device may also, or instead, be connected directly to the power source and/or the other electronic device via one or more charging and/or data transfer wires.

A wire that connects a first electronic component in the front portion and a second electronic component in a corresponding arm is housed in an interior portion of each hinge (operation 608). For example, the wire may include an FPC that is routed through a hollow interior of the hinge and/or at a position that is offset from a center of the hinge. As a result, the wire may wrap around the hinge as the arm is rotated about the hinge.

Finally, an exterior portion of each hinge is disposed over the corresponding wire to hide the wire during rotation of the corresponding arm about the hinge between a folded position and an unfolded position (operation 610). For example, the exterior portion may include a cap and/or other component that extends to cover the wire when the arm is folded inward (e.g., when the wearable electronic device is not being worn).

Figure 7:
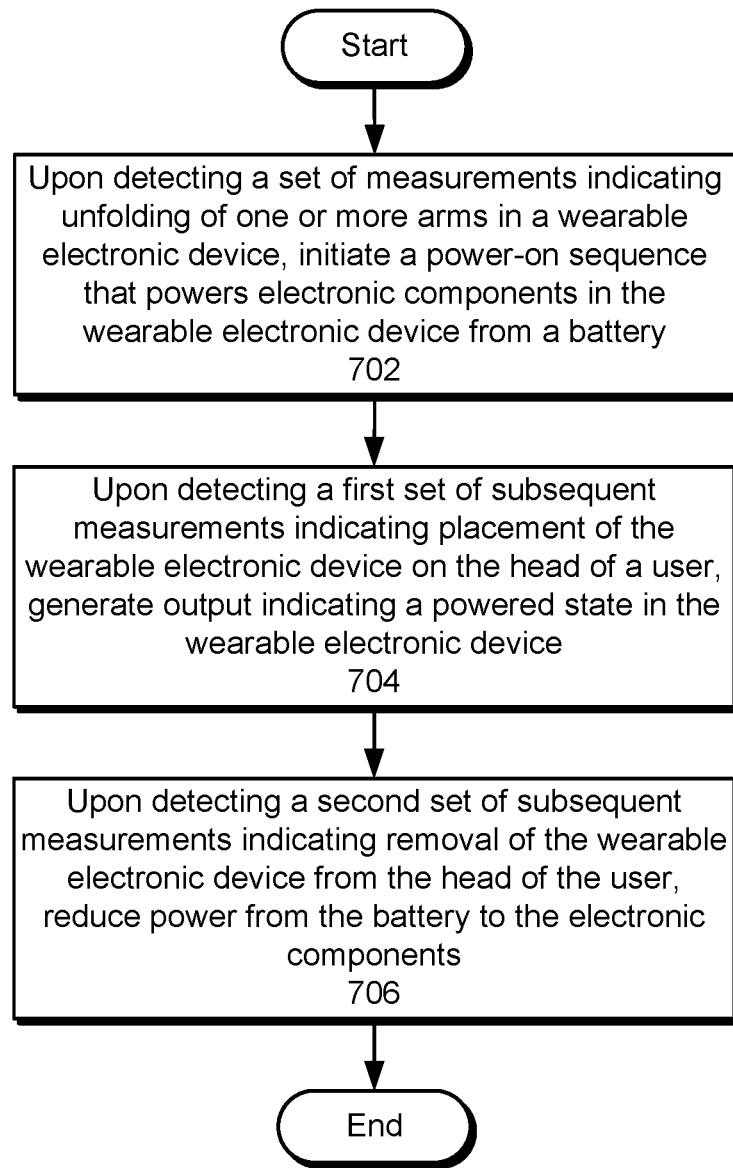
FIG. 7 shows a flowchart of performing on/off detection in a wearable electronic device in accordance with one or more embodiments.

FIG. 7 shows a flowchart of performing on/off detection in a wearable electronic device in accordance with one or more embodiments. In one or more embodiments, one or more of the steps may be omitted, repeated, and/or performed in a different order. Accordingly, the specific arrangement of steps shown in FIG. 7 should not be construed as limiting the scope of the embodiments.

Initially, a power-on sequence that powers electronic components in the wearable electronic device from a battery is initiated upon receiving a set of measurements indicating unfolding of one or more arms in the wearable electronic device (operation 702). For example, the measurements may be obtained using an infrared and/or other type of proximity sensor on each arm of the wearable electronic device. As a result, unfolding of the arms in the wearable electronic device may be detected as the proximity of an object (e.g., one of the arms) to one of the infrared sensors (e.g., an infrared sensor on the other arm), followed by a lack of proximity of any objects to either of the infrared sensors.

In another example, the measurements may be obtained using a magnet in one arm of the wearable electronic device and a Hall effect sensor and/or reed switch in the other arm of the wearable electronic device. As the arms are unfolded, the distance of the magnet from the Hall effect sensor and/or reed switch increases, thus changing the output voltage of the Hall effect sensor and/or the position of the reed switch.

In a third example, the measurements may be obtained using an accelerometer, gyroscope, and/or other type of inertial sensor in each arm of the wearable electronic device. The inertial sensor may produce acceleration and/or angular velocity measurements representing unfolding of the arms about hinges in the wearable electronic device.

In a fourth example, the measurements may be produced by electrical contacts that contact one another when the arms are unfolded, mechanical switches that are activated when the arms are unfolded, and/or other sensors that are capable of detecting a change in the position of the arms. After unfolding of the arms is detected, the power-on sequence may be initiated to activate some or all functionality provided by the wearable electronic device.

Next, upon detecting a first set of subsequent measurements indicating placement of the wearable electronic device on the head of a user, output indicating a powered state of the wearable electronic device is generated (operation 704). For example, the first set of subsequent measurements may be obtained using infrared and/or other proximity sensors on the arms of the wearable electronic device. As a result, placement of the wearable electronic device on the user's head may be measured as an initial lack of proximity of any objects to either of the infrared sensors (e.g., when the arms are initially unfolded), followed by a proximity of both infrared sensors to an object (e.g., when the arms are placed over the user's ears and thus contact the user's head).

In another example, the first set of subsequent measurements may be obtained using inertial sensors in the wearable electronic device. Such measurements may include a tilt measurement representing a transition of the wearable electronic device from a substantially vertical position to a substantially horizontal position, a displacement of the wearable electronic device in an upward and backward direction, and/or an increase in motion of the wearable electronic device after the tilt measurement and displacement are detected.

In a third example, the first set of subsequent measurements may be obtained using a capacitive sensor along a nose bridge and/or other portion of the wearable electronic device that comes into contact with the user's skin when the wearable electronic device is worn. Capacitive measurements made by the capacitive sensor may thus change once the wearable electronic device is placed on the user's head.

In a fourth example, the first set of subsequent measurements may be produced by a strain gauge disposed within the frame. After the wearable electronic device is placed on the user's head, the strain measured by the strain gauge may increase.

After the wearable electronic device is detected to be on the user's head, output such as a light, a sound, a vibration, and/or a notification may be generated on the wearable electronic device and/or another electronic device to which the wearable electronic device is paired. Power supplied to electronic components in the wearable electronic device may also be increased to fully activate the functionality of the wearable electronic device while the wearable electronic device is worn by the user.

Finally, upon detecting a second set of subsequent measurements indicating removal of the wearable electronic device from the head of the user, power from the battery to the electronic components is reduced (operation 706). For example, removal of the wearable electronic device from the user's head may be detected by the sensors described above as a reduction in the wearable electronic device's motion, folding of the arms in the wearable electronic device, and/or a downward sweeping motion of the wearable electronic device. In turn, the wearable electronic device may be powered down and/or placed into a low-power mode to conserve battery while the wearable electronic device is not being used.

Figure 8:
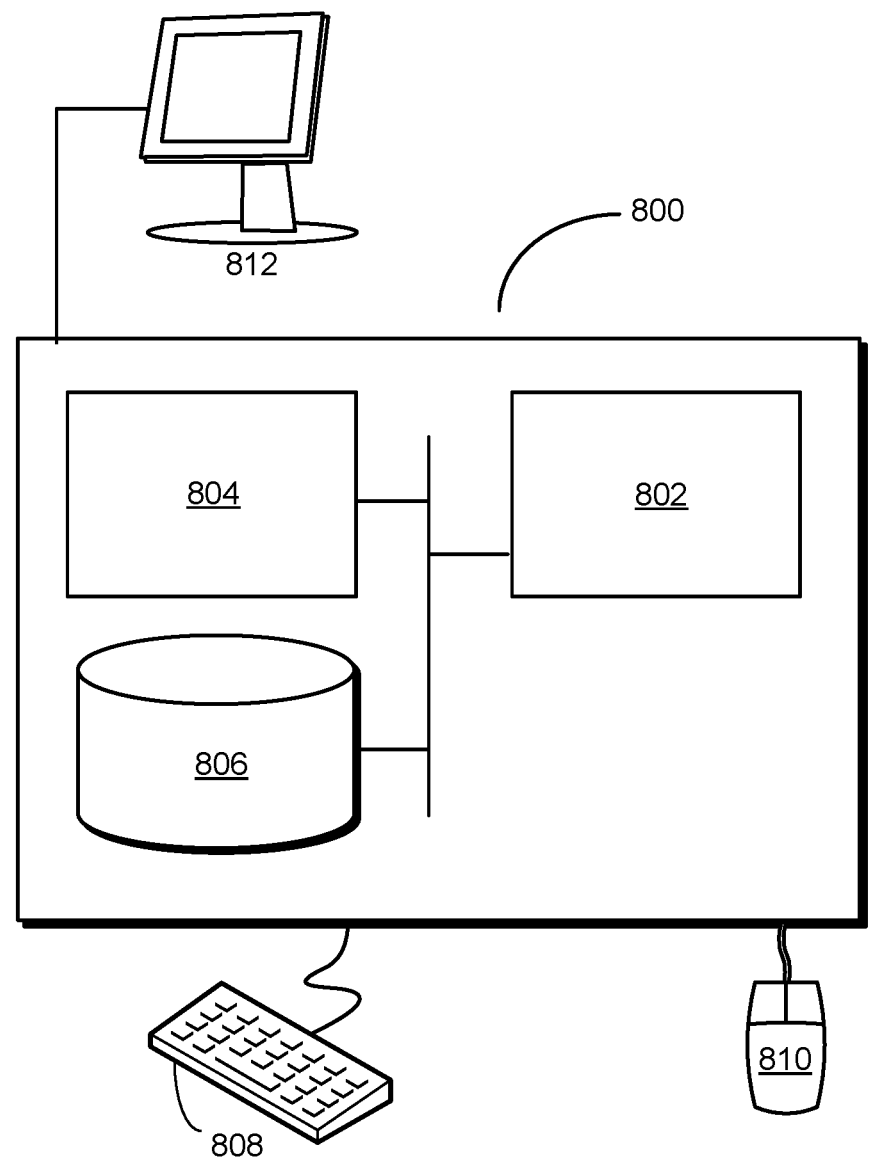
FIG. 8 shows a computer system in accordance with one or more embodiments.

FIG. 8 shows a computer system 800 in accordance with one or more embodiments. Computer system 800 includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for operating a wearable electronic device such as a headset, head-mounted display, helmet-mounted device, hat-mounted device, eyeglasses, safety glasses, and/or smartglasses. The system may include a sensing apparatus that includes one or more infrared sensors, Hall effect sensors, reed switches, accelerometers, gyroscopes, capacitive sensors, touch sensors, and/or other types of sensors. The sensing apparatus may be used to detect proximity of various portions of the wearable electronic device (e.g., front, arms, etc.) to objects and/or motion in the wearable electronic device.

The system may also include a processing apparatus that analyzes measurements from the sensing apparatus. When measurements indicating unfolding of one or more arms in the wearable electronic device are detected, the processing apparatus initiates a power-on sequence that powers electronic components in the wearable electronic device from a battery in the wearable electronic device. When subsequent measurements indicating placement of the wearable electronic device on a user's head are detected, the processing apparatus generates output indicating a powered state in the wearable electronic device. When additional subsequent measurements indicating removal of the wearable electronic device from the user's head are detected, the processing apparatus reduces power from the battery to the electronic components.

In addition, one or more components of computer system 800 may be remotely located and connected to the other components over a network. Portions of the present embodiments (e.g., sensing apparatus, processing apparatus, wearable electronic device, etc.) may also be located on different nodes of a distributed system that implements the embodiments. For example, the present embodiments may be implemented using a cloud computing system that is connected to a remote wearable electronic device. The cloud computing system may process measurements from the wearable electronic device to perform on-detection and off-detection in the wearable electronic device.

Although the disclosed embodiments have been described with respect to a limited number of embodiments, those skilled in the art, having benefit of this disclosure, will appreciate that many modifications and changes may be made without departing from the spirit and scope of the disclosed embodiments. Accordingly, the above disclosure is to be regarded in an illustrative rather than a restrictive sense. The scope of the embodiments is defined by the appended claims.

What is claimed is:

1. A method, comprising:
    forming an antenna within a first metal hinge;
    connecting the first metal hinge to a front portion of a wearable electronic device and a first arm of the wearable electronic device;
    housing, in an interior portion of the first metal hinge, a wire that connects a first electronic component in the front portion and a second electronic component in the first arm;
    disposing an exterior portion of the first metal hinge over the wire to hide the wire during rotation of the first arm about the first metal hinge between a folded position and an unfolded position;
    connecting a second hinge to the front portion and a second arm of the wearable electronic device;
    coupling a first metal contact in the first metal hinge and a second metal contact in the second hinge to a first circuit for charging a battery in the wearable electronic device; and
    coupling a third metal contact in the first metal hinge and a fourth metal contact in the second hinge to a second circuit for transferring data between the wearable electronic device and another electronic device.

2. The method of claim 1, wherein forming the antenna within the first metal hinge comprises engraving a circuit trace onto a thermoplastic material using a laser direct structuring (LDS) technique.

* * * * *